(12) United States Patent
Kinoshita et al.

(10) Patent No.: US 6,305,868 B1
(45) Date of Patent: Oct. 23, 2001

(54) HOOK DEVICE

(75) Inventors: Yoshihiko Kinoshita; Tadashi Hachisuka, both of Osaka (JP)

(73) Assignee: Hasegawa Kogyo Co., Ltd., Osaka (JP)

( * ) Notice: Subject to any disclaimer, the term of this patent is extended or adjusted under 35 U.S.C. 154(b) by 0 days.

(21) Appl. No.: 09/466,893

(22) Filed: Dec. 20, 1999

(30) Foreign Application Priority Data

Mar. 5, 1999 (JP) .................................................. 11-058294

(51) Int. Cl.$^7$ ...................................................... B25G 3/36
(52) U.S. Cl. ........................... 403/49; 403/196; 52/655.1; 52/736.2
(58) Field of Search ............................. 403/49, 188, 192, 403/196, 315, 325; 52/655.1, 653.2, 736.2

(56) References Cited

U.S. PATENT DOCUMENTS

| 2,665,950 | * | 1/1954 | Johnson | ............................ 403/49 X |
| 5,040,916 | * | 8/1991 | Morgan | ............................. 403/49 X |

FOREIGN PATENT DOCUMENTS

197806-A1 * 6/1978 (GB) ..................................... 403/49

| 2 133 453 A | 7/1984 | (GB) . |
| 2 174 747 A | 11/1986 | (GB) . |
| 2 218 146 A | 8/1989 | (GB) . |

\* cited by examiner

*Primary Examiner*—Lynne H. Browne
*Assistant Examiner*—John R. Cottingham
(74) *Attorney, Agent, or Firm*—Armstrong, Westerman, Hattori, McLeland & Naughton, LLP

(57) ABSTRACT

A hook device having a hook body, a stopper for preventing the hook body from slipping off a member to be connected, an elastic member for biasing the stopper toward a slipping-off preventing position, and a connecting pin for connecting these components together. The stopper is formed with a slot having the connecting pin inserted therethrough. The slot has a stopper guide portion for permitting the stopper to move between the slipping-off preventing position and a slipping-off permitting position, and a stopper lock portion allowing the connecting pin to fit in when the stopper is further moved from the slipping-off permitting position. The hook device further has a stopper returning mechanism for moving a stopper unlocking knob portion toward the slipping-off preventing position.

6 Claims, 11 Drawing Sheets

HOOK DEVICE

BACKGROUND OF THE INVENTION

The present invention relates to hook devices for use in assembling temporary scaffolds and built-in work platforms at construction sites.

Such hook devices are fixed to pipes, one at each end of the pipe, or to a scaffold board, in a pair to each of opposite ends of the board, and then removably fitted to other members fixed to the scaffold or work platform. Already known is a hook device which comprises a hook body having an inverted U-shaped inner peripheral surface formed by an upper wall, a front wall and a rear wall and fittable to a member to be connected, a stopper disposed in a stopper space formed in the hook body and having a retaining portion projectable beyond a lower end of the rear wall of the hook body toward a lower end of the front wall for preventing the hook body from slipping off the member to be connected by engagement therewith, the stopper being movable from a slipping-off preventing position to a slipping-off permitting position in which the retaining portion is positioned away from the lower end of the front wall to permit the hook body to slip off the member to be connected, an elastic member for biasing the stopper toward the slipping-off preventing position, and a connecting pin extending between and attached to opposite side walls of the hook body defining the stopper space for connecting together the hook body, the stopper and the elastic member, the connecting pin having an intermediate portion loosely inserted through a hole formed in the stopper to render the stopper pivotally movable about the axis of the connecting pin.

Although the stopper is required for the hook device to assure safety, the stopper will interfere with work, for example, when the temporary scaffold is disassembled. Stated more specifically, when the pipe or scaffold board provided with the hook device is to be removed, there arises a need to move the stopper to the slipping-off permitting position against the biasing force of the elastic member. Although immovable while being held by hand, the stopper returns to the slipping-off preventing position if released from the hand. It is therefore impossible to disassemble the scaffold or work platform by one person, hence the problem of a poor work efficiency.

SUMMARY OF THE INVENTION

An object of the present invention is to provide a hook device which is adapted to achieve an improved work efficiency in assembling temporary scaffolds or built-up work platforms at construction sites.

The present invention provides a hook device which comprises a hook body having an inverted U-shaped inner peripheral surface formed by an upper wall, a front wall and a rear wall and fittable to a member to be connected, a stopper disposed in a stopper space formed in the hook body and having a retaining portion projectable beyond a lower end of the rear wall of the hook body toward a lower end of the front wall for preventing the hook body from slipping off the member to be connected by engagement therewith, the stopper being movable from a slipping-off preventing position to a slipping-off permitting position in which the retaining portion is positioned away from the lower end of the front wall to permit the hook body to slip off the member to be connected, an elastic member for biasing the stopper toward the slipping-off preventing position, and a connecting pin extending between and attached to opposite side walls of the hook body defining the stopper space for connecting together the hook body, the stopper and the elastic member, the hook device being characterized in that the stopper is formed with a slot having an intermediate portion of the connecting pin inserted therethrough, the slot comprising a stopper guide portion for permitting the stopper to move between the slipping-off preventing position and the slipping-off permitting position, and a stopper lock portion extending from the stopper guide portion and allowing the connecting pin to engage in when the stopper is moved from the slipping-off permitting position further toward a direction opposite to the slipping-off preventing position.

When the hook device is fitted to a member having a circular cross section and to be connected to another member or pipe, the retaining portion of the stopper is first moved from the slipping-off preventing position to the slipping permitting position by being pushed by the member to be connected, and thereafter returned to the slipping-off preventing position by being biased by the elastic member upon the hook body fitting to the member to be connected. When the stopper is moved from the slipping-off permitting position further in a direction opposite to the slipping-off preventing position, the connecting pin fits into the stopper lock portion of the slot, whereby the stopper is restrained from moving while permitting slipping off. Thus, the hook device is made readily removable from the member to be connected. Accordingly, when a pipe or scaffold board fixedly provided with such hook devices at its opposite ends is to be removed, the stopper of each hook device is held in the slipping-off permitting position against movement, and the pipe or scaffold board is then lifted in its entirety, whereby the pipe or board can be removed easily.

Preferably, a projection is provided on each of opposite side surfaces of the stopper, and the hook body is formed with a guide groove for guiding the stopper. While the slotted portion of the stopper is guided by the connecting pin, each projection of the stopper is then additionally guided by the guide groove of the hook body, rendering the stopper smoothly movable.

Preferably, the elastic member is a double torsion coil spring, and the connecting pin is inserted through coil portions of the elastic member, the elastic member having a joined end retained by an engaging portion on the hook body and free ends bearing on the projections of the stopper for biasing the stopper toward the slipping-off preventing position. A proper elastic force then acts on the stopper, enabling the connecting pin to connect the hook body, the stopper and the elastic member with greater ease.

Preferably, the stopper has an unlocking knob portion projecting upward from the stopper space, and the connecting pin as fitted in the stopper lock portion is movable into the stopper guide portion by moving the knob portion toward the slipping-off preventing position. The stopper can then be returned to the slipping-off preventing position easily.

Preferably, the hook device further comprises means for returning the unlocking knob portion toward the slipping-off preventing position while the hook body is being removed from the member to be connected or while the hook body is being fitted to the member. The stopper, which is brought to the slipping-off permitting position once, then returns to the slipping-off preventing position upon the hook body being fitted to the member to be connected. This eliminates the manual procedure for moving the unlocking knob of the stopper, further obviating the likelihood of using the hook device in such an unstable state that the hook body is fitted to the member with the stopper in the slipping-off permitting position.

Preferably, the stopper returning means comprises an elastic member, a stopper return lever for transmitting the elastic force of the elastic member to the stopper, and a pivot for pivotally moving the stopper return lever thereon, and the stopper return lever is formed at an upper end thereof with a stopper pushing portion opposed to the stopper from below when the stopper is in the slipping-off permitting position with the hook body fitted around the member, an elastic force acting on a lower end of the stopper return lever. As the hook body is removed from the member to be connected, the elastic force of the elastic member moves the stopper return lever about the pivot, consequently causing the stopper pushing portion to give the stopper an upward force, i.e., a force to move the unlocking knob toward the slipping-off preventing position. The stopper is moved toward the slipping-off preventing position with this force.

It is desired that the pivot be provided in the vicinity of the stopper pushing portion. The elastic force of the elastic member can then be transmitted as amplified to the stopper. This makes the stopper movable toward slipping-off preventing position with a small elastic force.

DESCRIPTION OF THE PREFERRED EMBODIMENTS

Embodiments of the invention will be described below with reference to the drawings. In the following description, the terms "upper" and "lower" refer respectively to the upper and lower sides of FIG. 1, and therefore of FIGS. 4 and 8, the term "front" refers to the left-hand side of these drawings, and the term "rear" to the right-hand side thereof. The terms "left" and "right" are used for the device as it is seen from behind forward.

Figure 1:
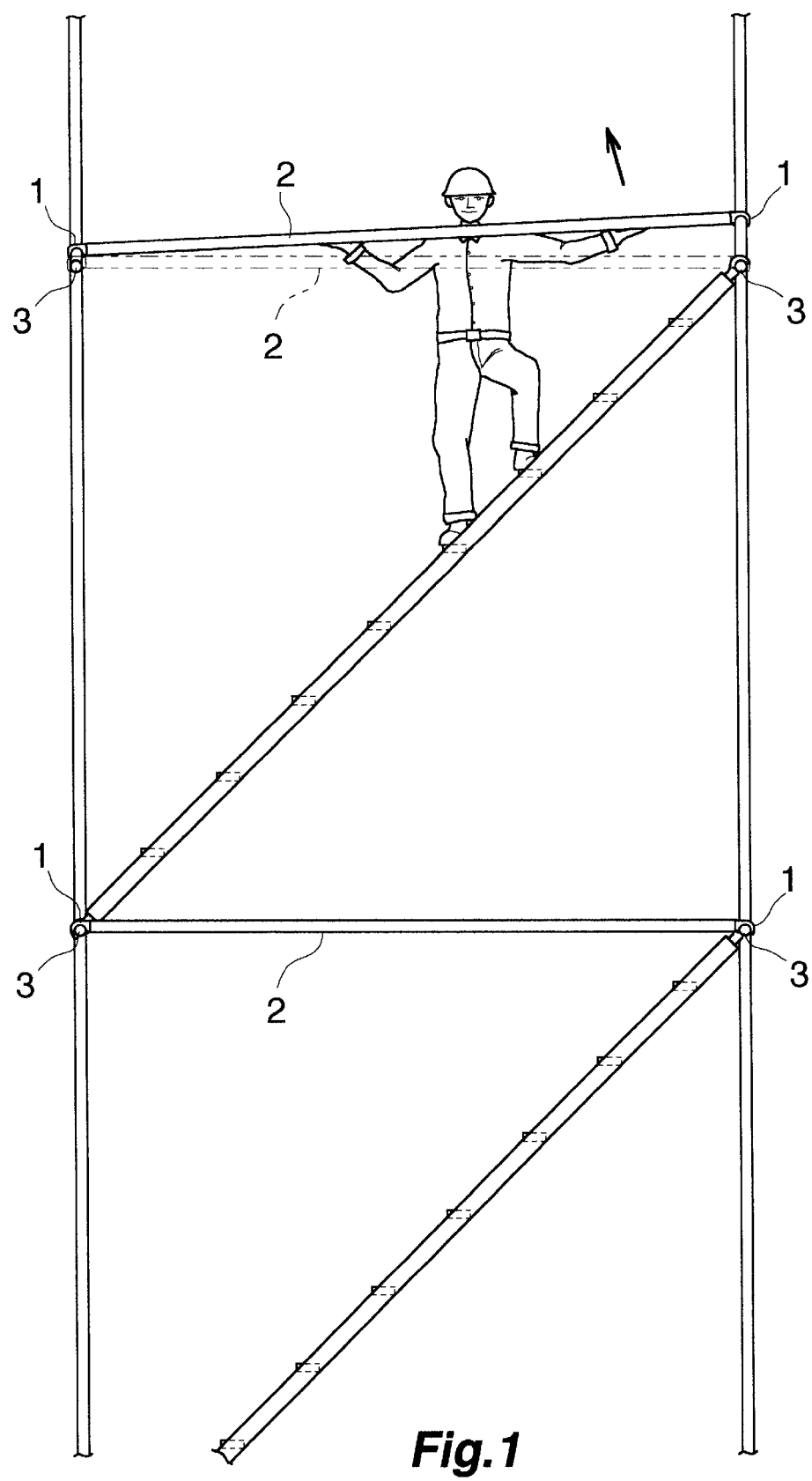
FIG. 1 is a side elevation showing a scaffold in which hook devices of the invention are used.
Figure 2:
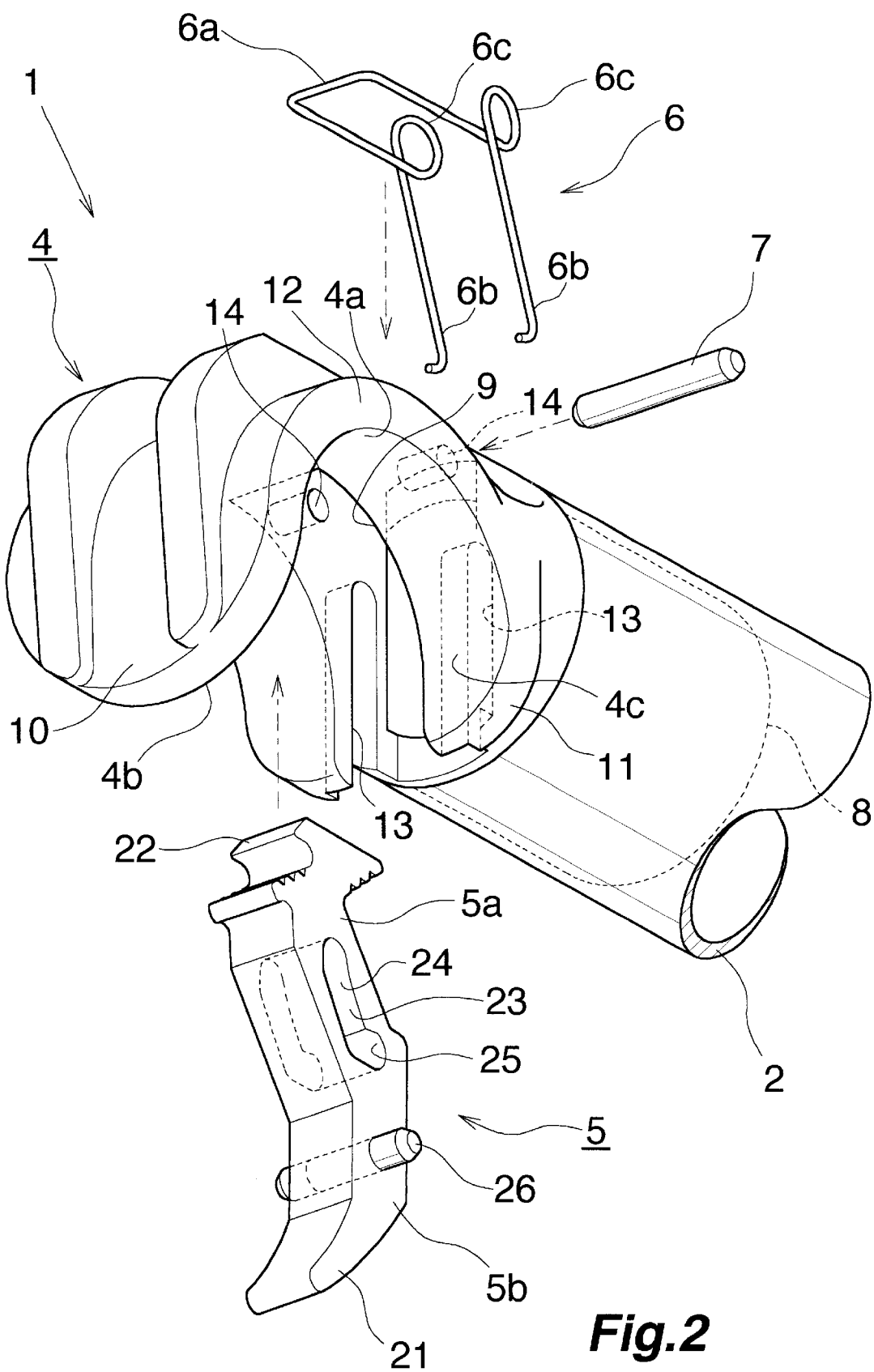
FIG. 2 is an exploded perspective view of a hook device of first embodiment.
Figure 3:
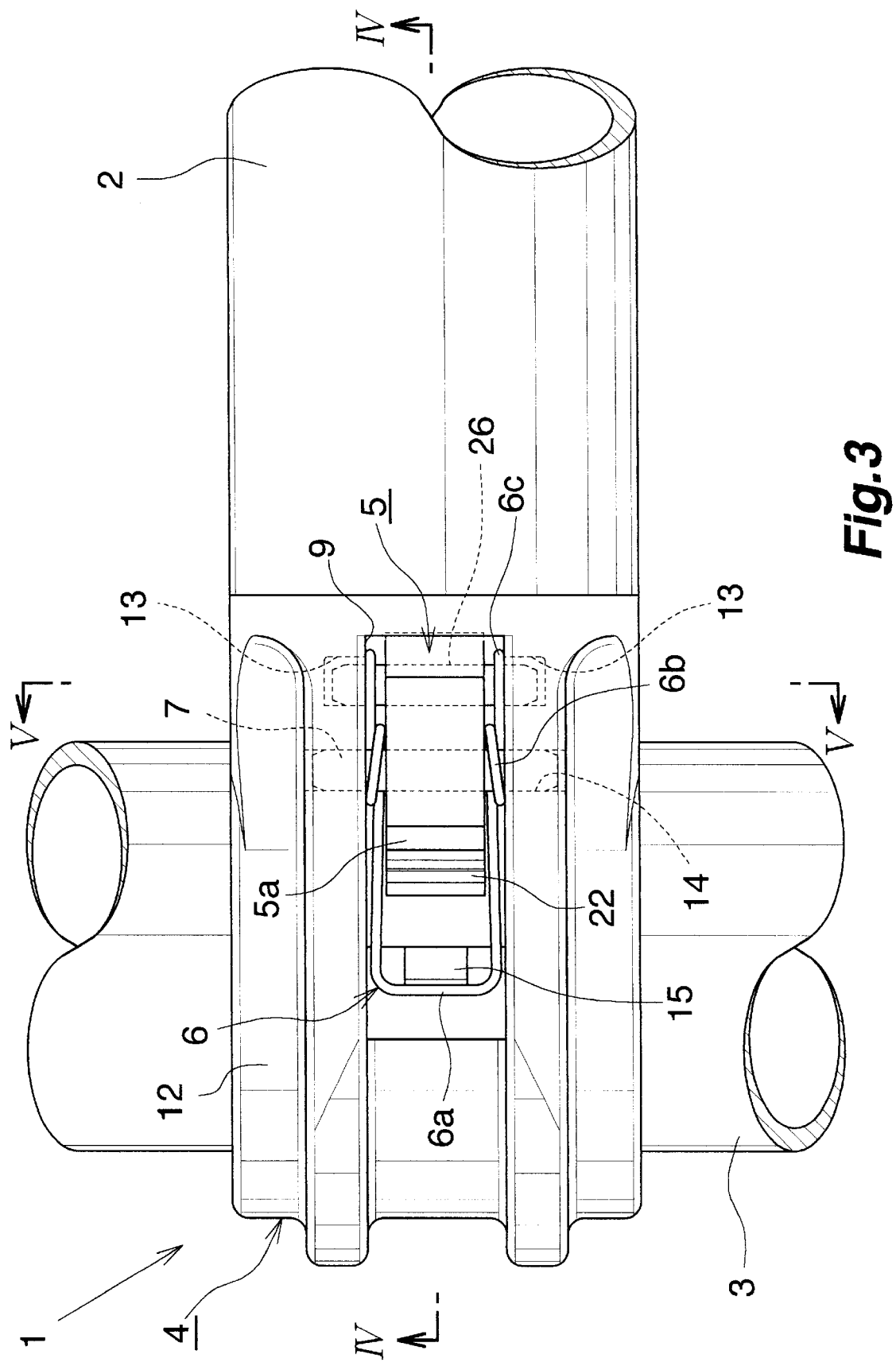
FIG. 3 is a plan view of the same.

The present invention provides a hook device 1 for use in separably assembling scaffolds. As shown in FIG. 1, for example, two hook devices 1 are attached respectively to the front and rear ends of a pipe 2 of circular cross section and removably fitted respectively to the front and rear members 3 to be connected to the pipe 2 and adjacent to each other. The hook device 1 at the front side will be described below.

FIGS. 2 to 7 show the hook device 1 as a first embodiment. As illustrated, the hook device 1 of the first embodiment comprises a hook body 4 fittable to the member 3 to be connected, a stopper 5 movable between an slipping-off preventing position where the stopper prevents the hook body 4 from slipping off the member 3 and a slipping-off permitting position where the stopper 5 permits the hook body 4 to slip off the member 3, an elastic member 6 for biasing the stopper 5 toward the slipping-off preventing position, and a connecting pin 7 for connecting together the hook body 4, stopper 5 and elastic member 6.

The hook body 4 is inverted U-shaped and has an opening facing downward. The hook body 4 has a semicylindrical inner surface 4a intimately fittable to the upper half of the member 3 to be connected, and front and rear vertical inner surfaces 4b, 4c extending from the semicylindrical inner surface 4a downward. The hook body 4 has a front wall 10 having a lower end projecting downward beyond the lower end of a rear wall 11 thereof. The rear side of the hook body 4 is integral with a cylindrical portion 8 having an axis extending from the front rearward. The cylindrical portion 8 is inserted in and joined to the front end portion of the pipe 2.

The rear half of the hook body 4 has a stopper space 9 extending vertically therethrough and accommodating the stopper 5 therein movably. An upper wall 12 of the hook body 4 is formed near the rear end thereof with a pin hole 14 extending therethrough transversely thereof, i.e., through opposite (left and right) side walls defining the stopper space 9. The connecting pin 7 has an intermediate portion positioned in the stopper space 9 and opposite end portions tightly fitted in the pin hole 14.

The stopper 5 comprises an upper half 5a having at its upper end an unlocking knob 22 projecting upward from the stopper space 9 when the stopper 5 is in the slipping-off permitting position, and a lower half 5b having at its lower end a slipping-off preventing retaining portion 21 projecting downward from the stopper space 9 when the stopper is in the slipping-off preventing position.

The upper half 5a of the stopper 5 is formed with a slot 23 extending therethrough axially (leftward or rightward) of the hook body 4. The connecting pin 7 has its intermediate portion inserted in the slot 23 and is movable relative to the stopper 5 within a range limited by the wall face defining the slot 23, whereby the stopper 5 is made movable relative to the hook body 4. The slot 23 comprises a straight stopper guide portion 24 elongated in a direction substantially orthogonal to a radial direction of the semicylindrical inner surface 4a of the hook body 4, and a stopper lock portion 25 outwardly extending from the lower end of the guide portion 24 at an angle of about 120 deg with the portion 24. The stopper guide portion 24 permits the stopper 5 to move between the slipping-off preventing position and the slipping-off permitting position, while the stopper lock portion 25 serves to prevent the stopper 5 from returning from the slipping-off permitting position to the slipping-off preventing position.

A spring pin is inserted in a circular through bore formed in the approximate center of the lower half 5b of the stopper 5, with its opposite ends projecting therefrom, whereby a projection 26 projecting axially of the hook body 4 is formed on each of opposite side surfaces of the stopper lower half 5b. A vertical guide groove 13 for guiding the side projection 26 is formed in each of opposite side walls defining the stopper space 9 of the hook body 4. The guide groove 13 has a width (in the front-to-rear or longitudinal direction) greater than the diameter of the projection 26, permitting the projection to slightly move forward or rearward within the guide groove 13.

The elastic member 6 is a double torsion coil spring comprising two torsion coil springs each having a portion 6c coiled one turn and joined end-to-end as at 6a. The connecting pin 7 is inserted through the coil portions 6c, and the joined end 6a is held by an engaging portion 15 provided on the hook body 4. The elastic member 6 has free ends 6a bearing on the respective projections 26 of the stopper 5 for biasing the stopper 5 toward the slipping-off preventing position. When free of any restraint, the elastic member 6 makes an angle of about 110 deg between the joined end portion 6a and the free end portions 6b. The elastic member exerts almost no elastic force when the stopper 5 is in the slipping-off preventing position.

Figure 4:
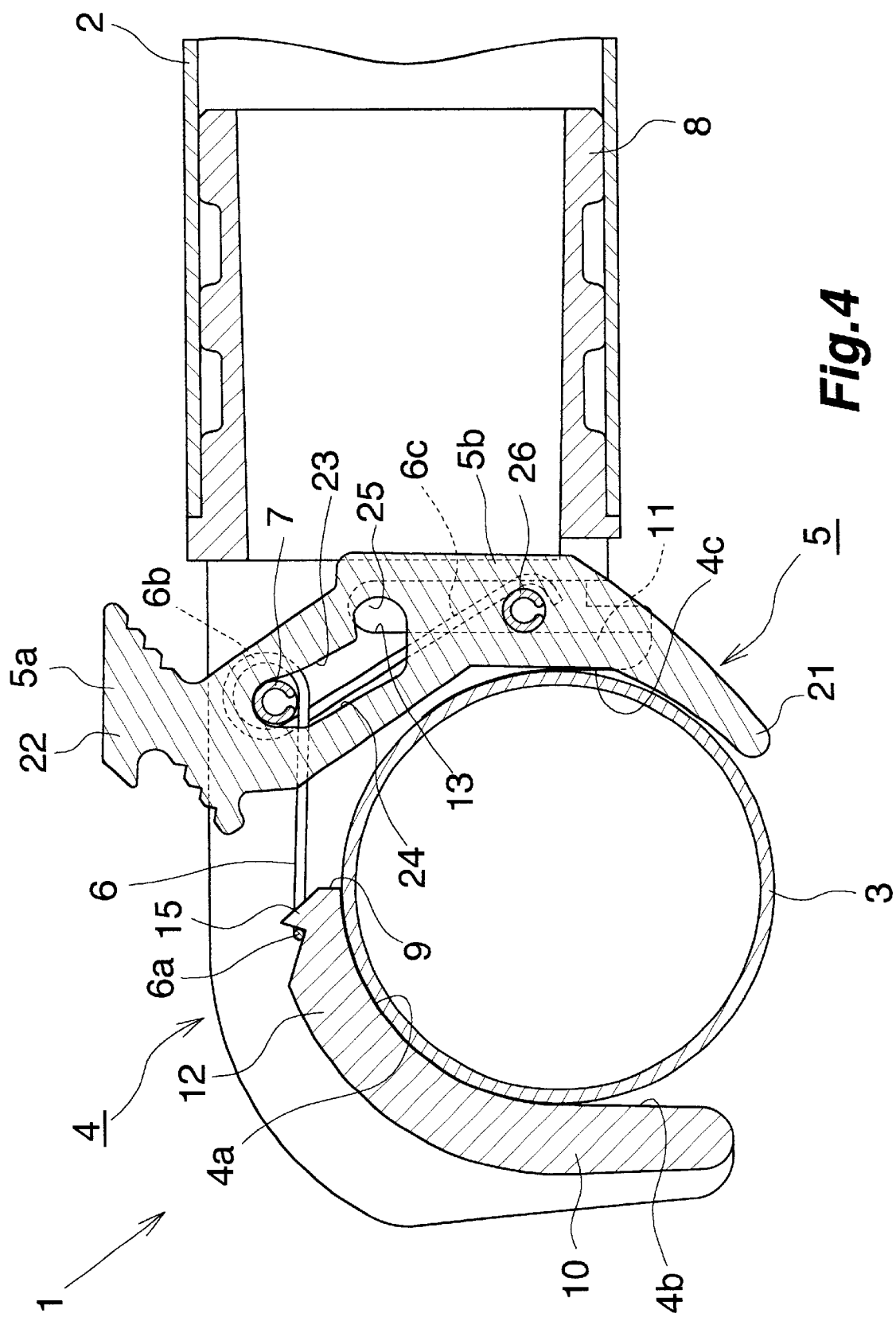
FIG. 4 is a view in section taken along the line IV—IV in FIG. 3.
Figure 5:
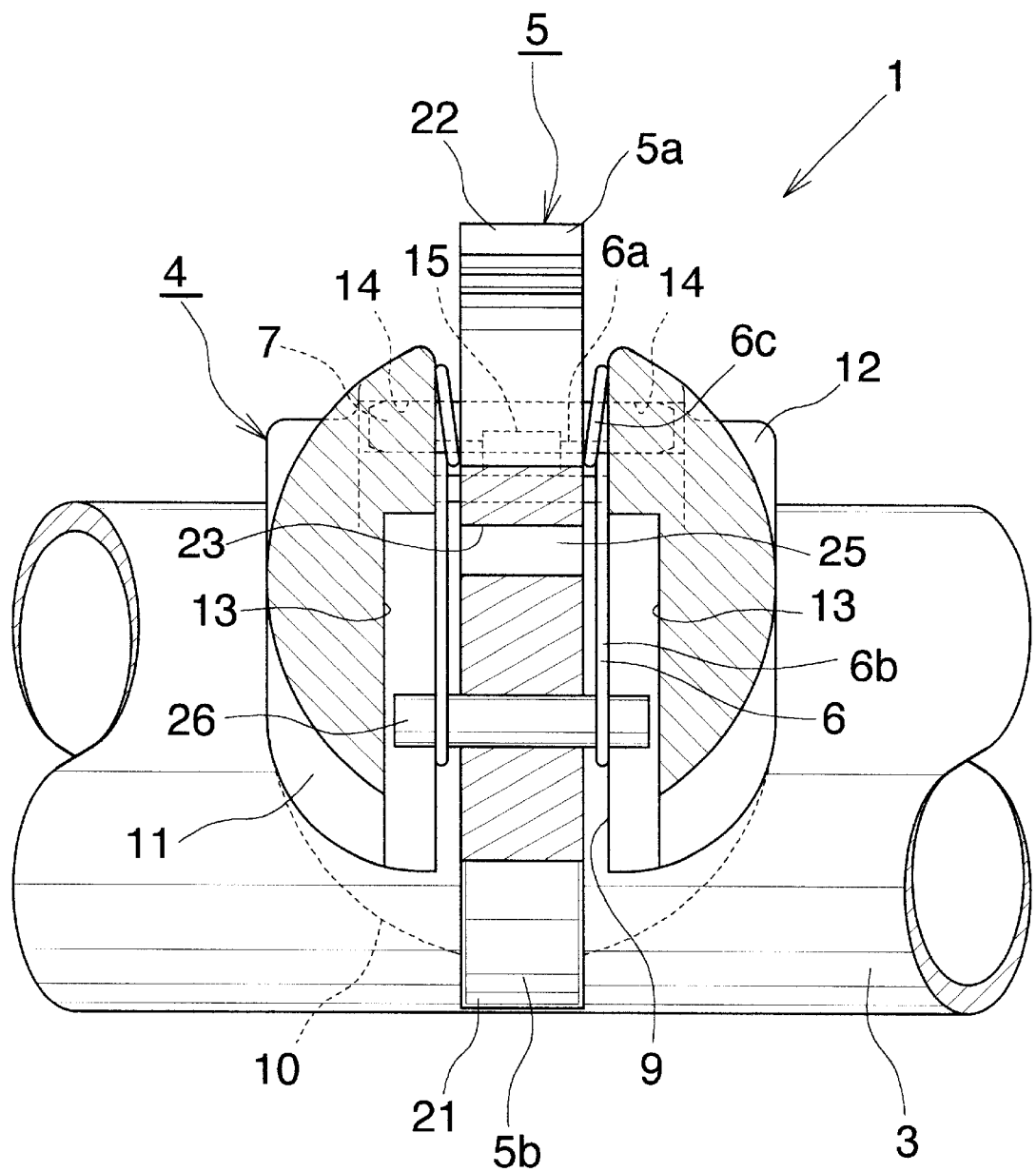
FIG. 5 is a view in section taken along the line V—V in FIG. 3.

When the stopper 5 is in the slipping-off preventing position, the lower half 5b of the stopper 5 is vertical, with its upper half 5a inclined forward at about 35 deg with a vertical as shown in FIG. 4. The retaining portion 21 of the stopper 5 in this position is projected forwardly downward beyond the lower end of the rear wall 11 into contact with the right lower portion of the member 3 to be connected to partly close the opening of the hook body 4. The arc-shaped upper end face of the slotted portion 23 defining the stopper guide portion 24 is in engagement with the upper half of the connecting pin 7. When the stopper 5 in this position is moved in a direction to move the retaining portion 21 away from the front wall 10 of the hook body 4, the stopper guide portion 24 moves obliquely upward relative to the connecting pin 7 with the projections 26 of the stopper 5 moved upward, increasing the downward biasing force of the elastic member 6. If the amount of retraction of the retaining portion 21 into the stopper space 9 is within a predetermined range in this case, the retaining portion 21 of the stopper 5 is returned to the slipping-off preventing position by the downward biasing force of the elastic member 6.

The procedure for fitting the hook device 1 of the first embodiment to the member 3, and that for removing the device therefrom will be described next with reference to FIGS. 6 and 7.

Figure 6:
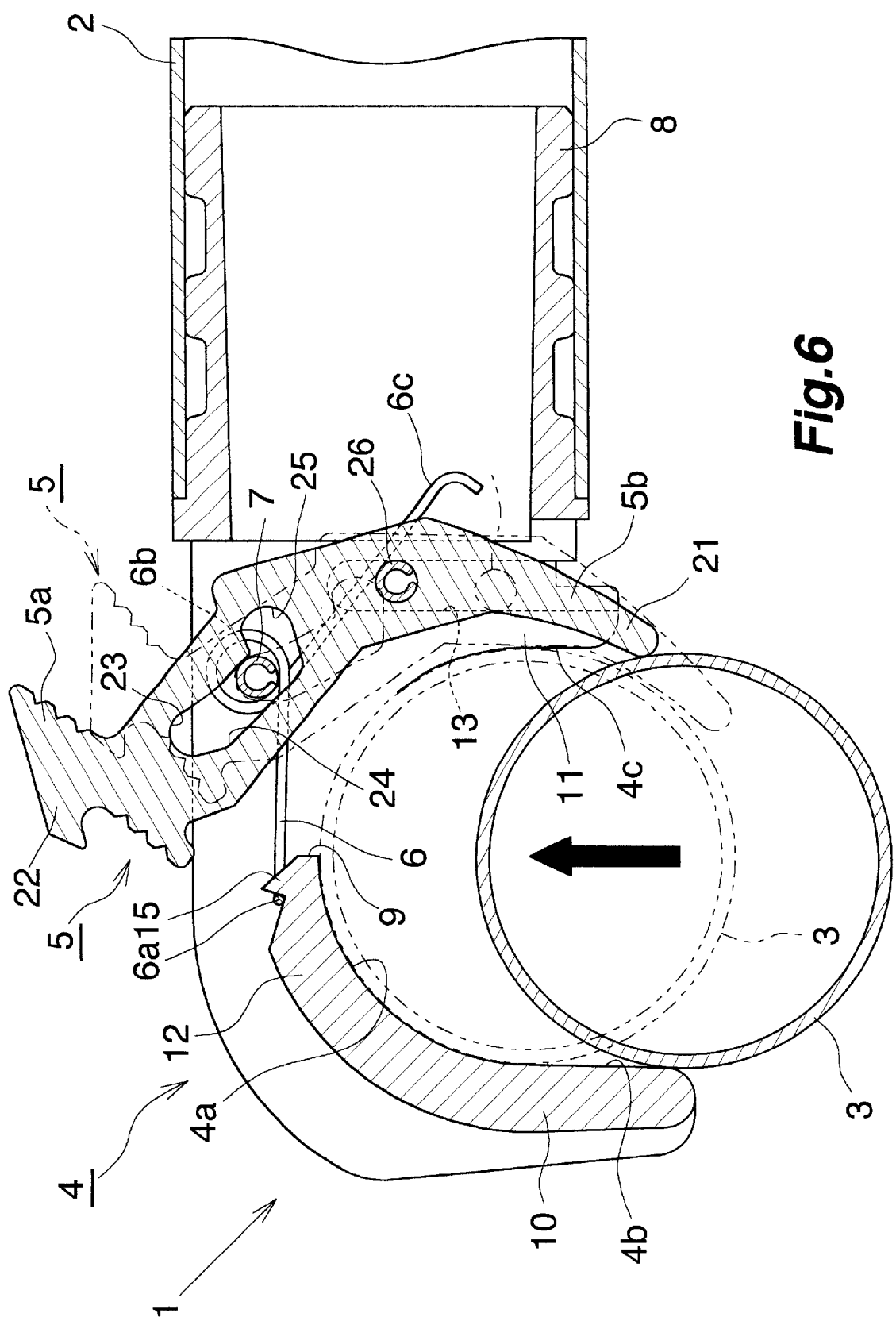
FIG. 6 is a view corresponding to FIG. 4 and showing the hook device while it is being fitted to the member to be connected.

With reference to FIG. 6, when the hook body 4 is progressively fitted around the member 3 to be connected to the pipe 2, the retaining portion 21 of the stopper 5 is pushed by the member 3 and retracted to the slipping-off permitting position shown in solid lines in the drawing. In this slipping-off permitting position, the connecting pin 7 is located close to the lower end of the stopper guide portion 24 of the slot 23 and movable upward or downward along this portion 24. The elastic force of the elastic member 6 biasing the projections 26 downward has been increased by an amount corresponding to the distance the projections 26 are moved upward. Accordingly, the hook body 4 and the member 5 are fitted to each other as indicated in chain lines in the drawing, and the connecting pin 7 is moved upward along the guide portion 24 of the slot 23 relative thereto, causing the stopper 5 to return to the slipping-off preventing position indicated in chain lines in the drawing. In this way, the hook device 1 can be fitted to the member 2 with ease.

Figure 7:
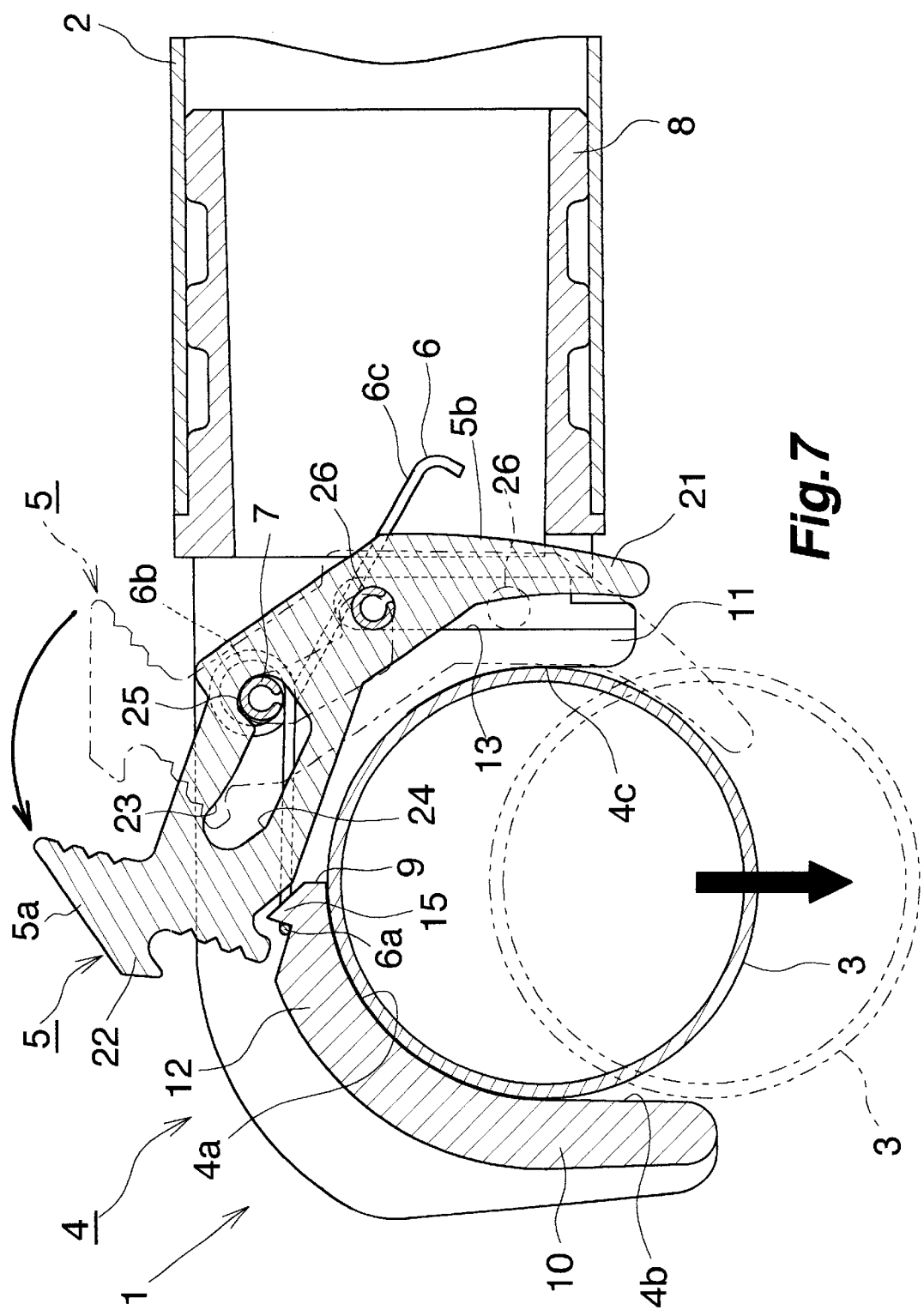
FIG. 7 is a view corresponding to FIG. 4 and showing a stopper as locked.

When the retaining portion 21 of the stopper 5 in the above state is further forced into the stopper space 9, the connecting pin 7 moves to the lower end of the stopper guide portion 24 and fits into the stopper lock portion 25 to assume the state shown in FIG. 7. Although the elastic member 6 acts to move the projections 26 downward in this state, the connecting pin 7 is unable to move along the slot 23, preventing the stopper 5 from returning to the slipping-off preventing position. The stopper 5 is now in a locked state, rendering the hook device 1 readily removable from the member 3. The stopper 5 in the slipping-off preventing position indicated in chain lines in FIG. 7 is movable in such a direction as to raise the unlocking knob 22 upward as indicated by an arrow in the drawing, but the knob is not movable horizontally straight forward, so that the stopper 15 is unlikely to move toward the slipping-off preventing position by inadvertently moving the unlocking knob 22.

The stopper 5 can be returned to the slipping-off preventing position by moving the connecting pin 7 into the stopper guide portion 24 of the slot 23, i.e., by moving the unlocking knob 22 rearward. The same movement can be effect by moving the retaining portion 21 forward instead of moving the knob 22 rearward. The stopper 5 can be held in the slipping-off preventing position when the hook body 4 is fitted around the member 3 again, by returning the stopper 5 to the slipping-off preventing position in this way.

With the hook device 1 of the first embodiment, the stopper 5 can be locked in the slipping-off permitting position, so that the stopper 5 is likely to remain locked in the slipping-off permitting position when the hook body 4 is fitted around the member 3 to be connected. This is likely to raise the problem that the hook device 1 will be removed if struck on by an article form below. A hook device 31 will be described below which is free of this problem and which is unlikely to become detached by a human error or an erroneous movement. Throughout the first embodiment described and the second embodiment to be described, like parts are designated by like reference numerals and will not be described repeatedly.

Figure 8:
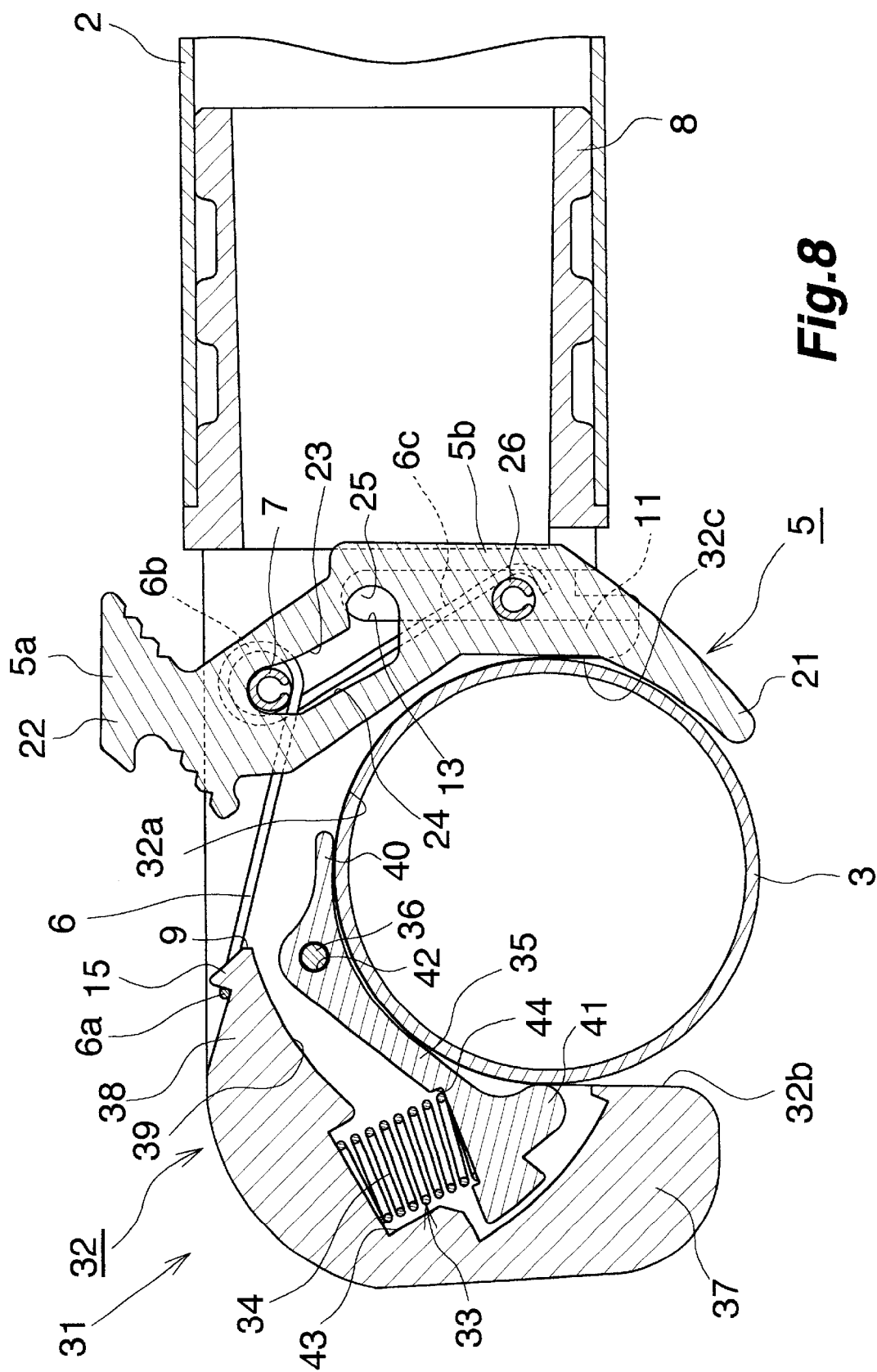
FIG. 8 is a view corresponding to FIG. 4 and showing a hook device of second embodiment.
Figure 9:
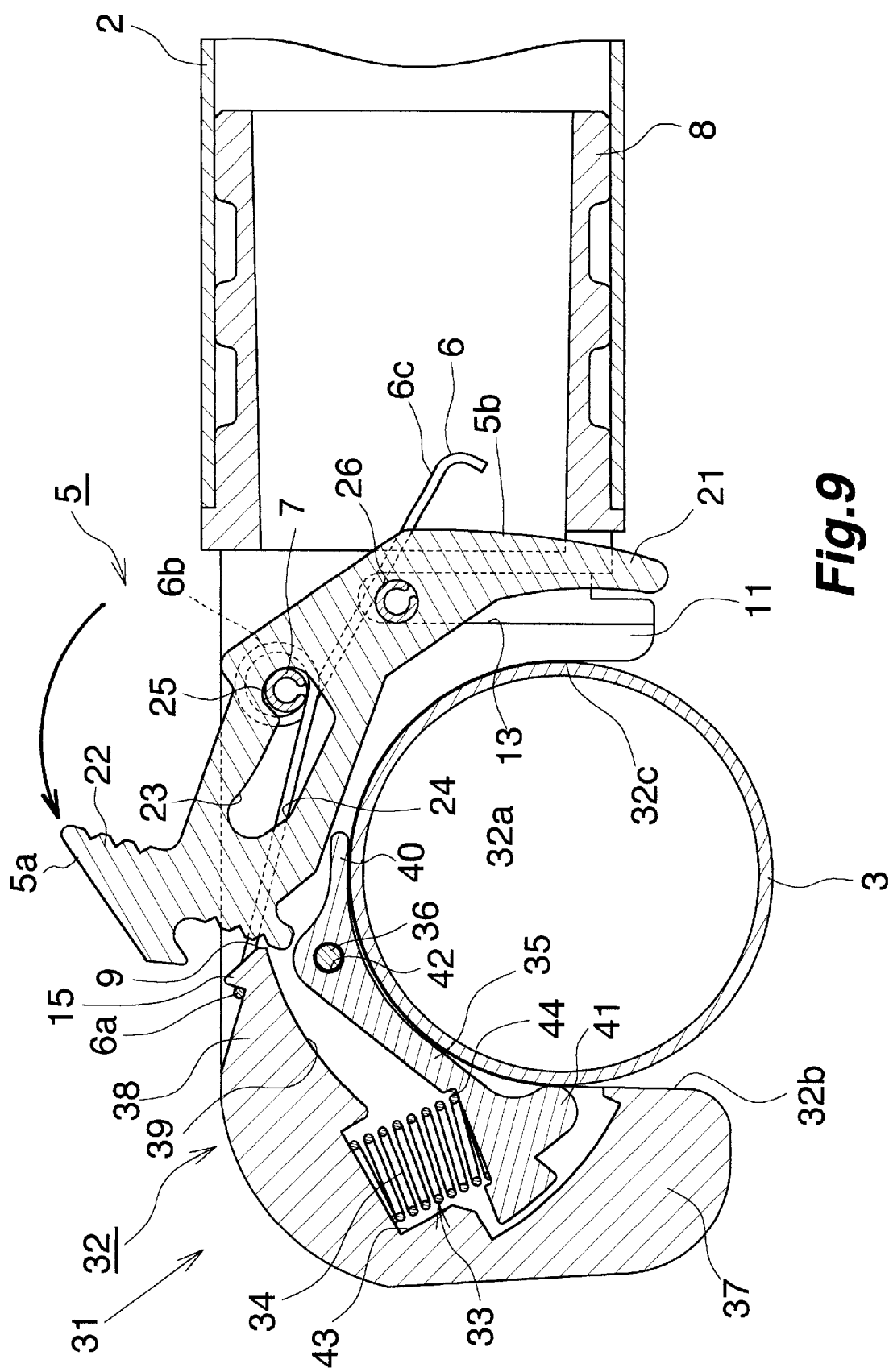
FIG. 9 is a view corresponding to FIG. 7 and showing the same.
Figure 10:
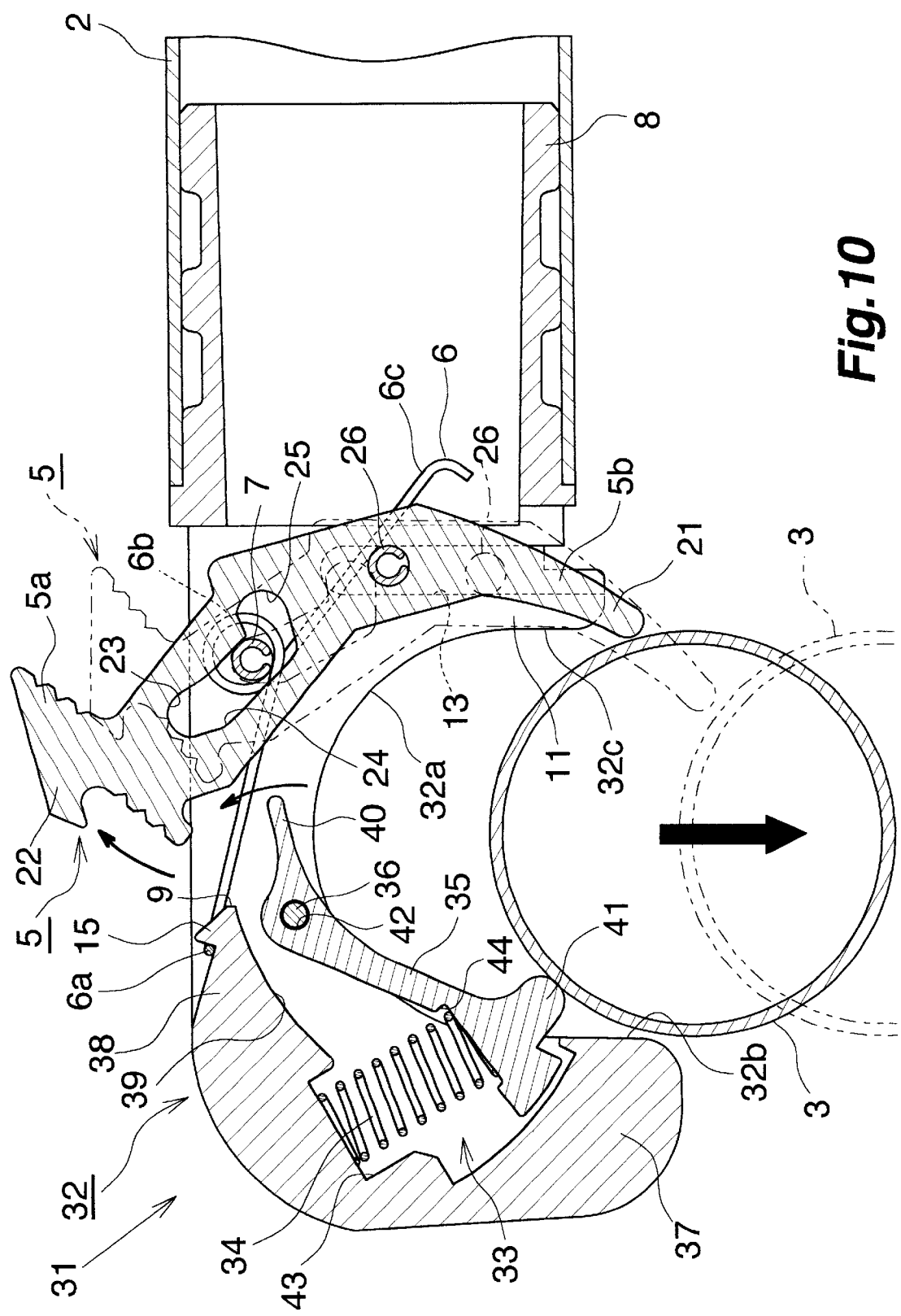
FIG. 10 is a view showing the hook device while it is being removed from the state of FIG. 7.

FIGS. 8 to 10 show the hook device 31 which is a second embodiment. This embodiment comprises the hook device 1 of the first embodiment, which is further provided with means 33 for returning the unlocking knob 22 of the stopper 5 toward the slipping-off preventing position when a hook body 32 is removed from the member 3 to be connected.

The stopper returning means 33 comprises a compression coil spring (elastic member) 34, a stopper return lever 35 for transmitting the elastic force of the spring to the stopper 5, and a pivot 36 for moving the stopper return lever 35 thereon.

The hook body 32 has a front wall 37 which has a greater thickness than that of the first embodiment. The front wall 37 and an upper wall 38 provide a returning means accommodating recessed portion 39 which is open toward the member 3. The front wall 37, upper wall 38 and rear wall 11 of the hook body 32 form an inverted U-shaped inner surface 32a for the member 3 to fit in.

With the hook body 32 fitted around the member 3, the stopper return lever 35 has a length extending from the top of the member 3 to the equator thereof. The part of the lever 35 in bearing contact with the top of the member 3 serves as a stopper pushing portion 40 opposed from below to the stopper 5 in the slipping-off permitting position. The lever 35 is not fully in face-to-face contact with the equatorial region of the member 3, but an upper part of outer end portion, having a circular-arc cross section, of a lever protuberance 41 protruding obliquely downward bears on the equatorial region.

The pivot 36 is loosely inserted through a bore 42 formed in the return lever 35 close to an upper end thereof and has left and right ends fixed to the hook body 32. The center of the pivot 36 is positioned slightly above and forwardly of the top of the member 3.

The compression coil spring 34 is retained by a spring cavity 43 facing obliquely downward and formed at the lower end of the recessed portion 39 of the hook body 32 and a spring cavity 44 facing obliquely upward and formed in the return lever 33 at the lower end thereof. The spring 34 presses the lower end of the lever 35 obliquely downward. The stopper pushing portion 40 of the return lever 35 is provided in proximity to the pivot 36, while the return lever 35 is biased by the coil spring 34 at a position remote from the pivot 36. Thus, the elastic force of the compression coil spring 34 can be transmitted as amplified to the stopper 5 by the return lever 35.

FIG. 8, corresponding to FIG. 4 showing the first embodiment in the slipping-off preventing position, shows the stopper 5 as held in the slipping-off preventing position by the downward biasing force of the elastic member 6 as described above. The stopper return lever 35 is held retracted in the recessed portion 39 by the outer end portion of downward protuberance 41 thereof being pressed by the equatorial region of the member 3. The compression coil spring 34 as compressed biases the lower end of the return lever 35 obliquely rearwardly downward, and the biasing force is received by the member 3.

FIG. 9, corresponding to FIG. 7 showing the stopper of the first embodiment held locked, shows the stopper 5 in the slipping-off permitting position, as restrained from returning toward the slipping-off preventing position as described above, rendering the hook body 32 readily removable from the member 3. Since the elastic force of the coil spring 34 biasing the return lever 35 is a force acting obliquely rearwardly downward, this force will not interfere with the upward removal of the hook body 32. In this state, the stopper pushing portion 40 of the return lever 35 is opposed to the stopper 5 from below in contact therewith. The portion of the stopper 5 in contact with the pushing portion 40 is positioned immediately below the upper end of stopper guide portion 24 of the slot 23.

FIG. 10 shows the hook body 32 while it is being removed from the member 3. According to the first embodiment, the hook device 1 is removed with the stopper in the locked state as shown in FIG. 7, and is held in the state of FIG. 7 after the completion of removal, whereas the hook device 31 changes in state according to the second embodiment as will be described below.

The lower end of the return lever 35 which end is pressed by the equatorial region of the member 3 and thereby held retracted in the recessed portion 39 is projected from the recessed portion 39 while contacting the portion of the member 3 upward from its equatorial region, as the hook body 32 is removed upward. This movement moves the return lever 35 about the pivot 36, moving the stopper pushing portion 40 upward. Accordingly, an upward force acts on the stopper 5 to produce a moment of the same direction as involved in rearwardly moving the unlocking knob 22 as supported by the connecting pin 7. Consequently, the unlocking knob 22 is moved rearward, and the hook device 31 is returned to the state indicated in chain lines when the hook body 32 is completely removed from the member 3. Thus, the state shown in FIG. 8 is restored without necessitating the action of the operator to return the stopper 5 toward the slipping-off preventing position. If the hook body 32 is fitted to the member 3 in this state, the state shown in FIG. 8 is obtained with the stopper 5 held in the slipping-off preventing position. In this way, the stopper returning means eliminates the likelihood of using the hook device in such an unstable state that the hook body 32 is fitted to the member 3 with the stopper 5 in the slipping-off permitting position. Although the procedure described above moves the unlocking knob 22 of the stopper 5 toward the slipping-off preventing position while removing the hook body 32 from the member 3, the unlocking knob 22 may be moved toward the slipping-off preventing position while the hook body 32 is being fitted to the member 3. The returning timing is not limited specifically insofar as the stopper 5 as located in the slipping-off permitting position is returned toward the slipping-off preventing position upon the hook body 32 being fitted to the member 3.

Figure 11:
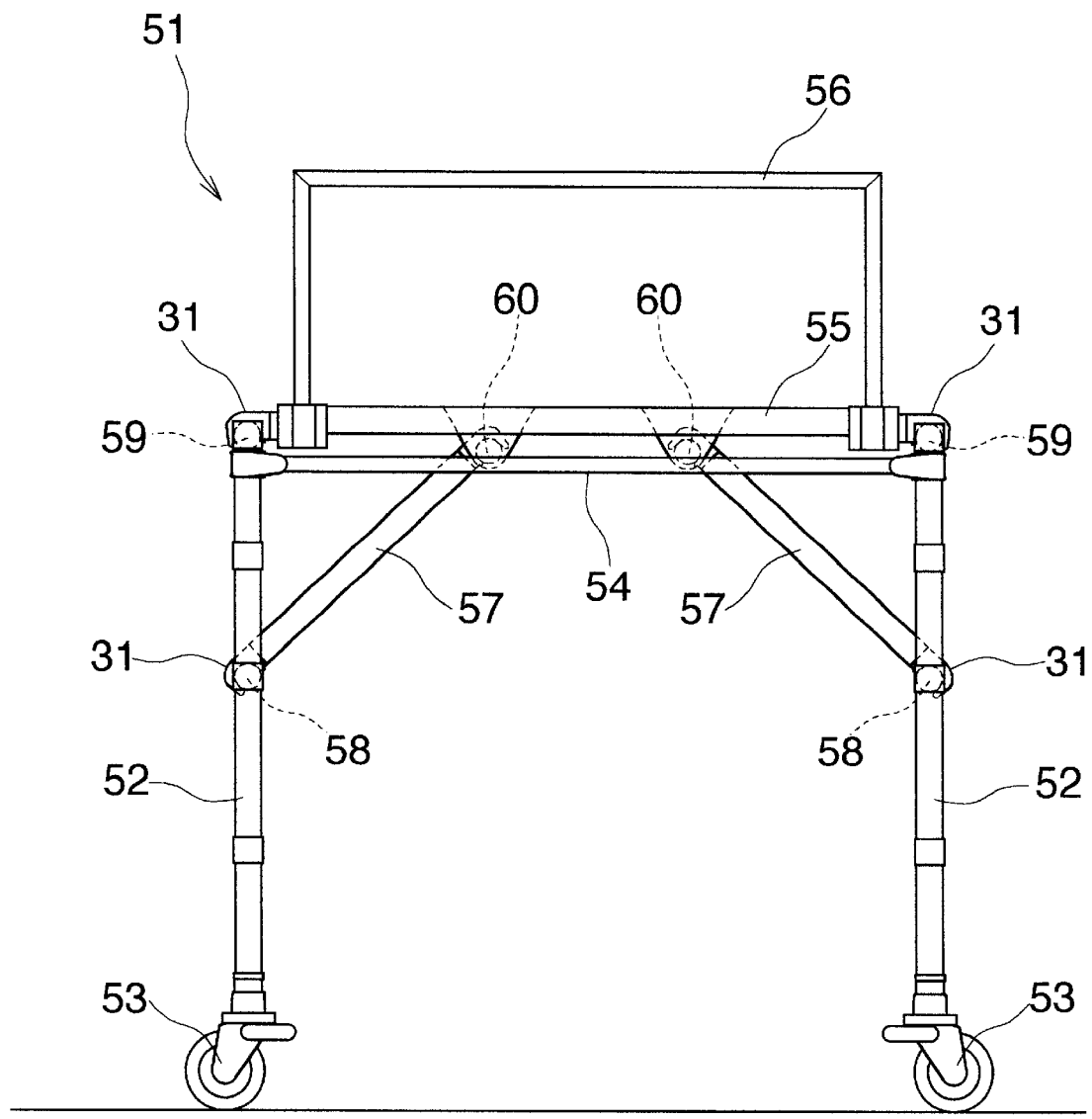
FIG. 11 is a side elevation showing a work platform in which hook devices of the invention are used.

The hook devices 1, 31 of the first and second embodiments, which are used for scaffolds such as the one shown in FIG. 1, are usable also for work platforms which are smaller than scaffolds and transportable or collapsible. FIG. 11 shows such a built-up work platform as an example. In the following description, the terms "front" and "rear" refer respectively to the left-hand side and right-hand side of FIG. 11. The work platform 51 comprises a front pair and a rear pair of legs 52 each having a castor 53, left and right side members 54 interconnecting the front and rear legs 52 at their upper ends, handrails 56 removably attached to a scaffold board 55, braces 57 each interconnecting and extending obliquely between the scaffold board 55 and a tread member 58 at an intermediate portion of each of the front and rear legs 52. Hook devices 31 embodying the invention are attached to the front and rear ends of the scaffold board 55. Each hook device 31 is fitted to a transverse member 59 in the form of a pipe and provided at the upper end of the leg 52. The brace 57 has one end pivotably supported by a bracket 60 on the scaffold board 55 and the other end having attached thereto the hook device 31, which is removably fitted to the tread member 58 in the form of a pipe.

The scaffold board 55 or the braces 57 can be assembled into the built-up work platform 51 merely by fitting the hook devices 31 to the transverse members 59 or the tread members 58 on the legs 52, ensuring work with good stability on the platform 51 without the likelihood of detachment from the assembly. The work platform 51 can be disassembled by one person since the stopper 5 can be locked in the slipping-off permitting position.

What is claimed is:

1. A hook device comprising a hook body having an inverted U-shaped inner peripheral surface formed by an upper wall, a front wall and a rear wall and fittable to a member to be connected, a stopper disposed in a stopper space formed in the hook body and having a retaining portion projectable beyond a lower end of the rear wall of the hook body toward a lower end of the front wall for preventing the hook body from slipping off the member by engagement therewith, the stopper being movable from a slipping-off preventing position to a slipping-off permitting position in which the retaining portion is positioned away from the lower end of the front wall to permit the hook body to slip off the member, an elastic member for biasing the stopper toward the slipping-off preventing position, and a connecting pin extending between and attached to opposite side walls of the hook body defining the stopper space for connecting together the hook body, the stopper and the elastic member, the hook device being characterized in that the stopper is formed with a slot having an intermediate portion of the connecting pin inserted therethrough, the slot comprising a stopper guide portion for permitting the stopper to move between the slipping-off preventing position and the slipping-off permitting position, and a stopper lock portion extending from the stopper guide portion and allowing the connecting pin to engage in when the stopper is moved from the slipping-off permitting position further toward a direction opposite to the slipping-off preventing position.

2. A hook device according to claim 1 wherein a projection is provided on each of opposite side surfaces of the stopper, and the hook body is formed with a guide groove for guiding the stopper.

3. A hook device according to claim 2 wherein the elastic member is a double torsion coil spring, and the connecting pin is inserted through coil portions of the elastic member, the elastic member having a joined end retained by an engaging portion on the hook body and free ends bearing on the projections of the stopper for biasing the stopper toward the slipping-off preventing position.

4. A hook device according to claim 1 to 3 wherein the stopper has an unlocking knob portion projecting upward from the stopper space, and the connecting pin as fitted in the stopper lock portion is movable into the stopper guide portion by moving the knob portion toward the slipping-off preventing position.

5. A hook device according to claim 4 which further comprises means for returning the unlocking knob portion toward the slipping-off preventing position.

6. A hook device according to claim 5 wherein the means for returning the unlocking knob portion toward the slipping-off preventing position comprises a further elastic member, a stopper return lever for transmitting the elastic force of said further elastic member to the stopper, and a pivot for pivotally moving the stopper return lever thereon, and the stopper return lever is formed at an upper end thereof with a stopper pushing portion opposed to the stopper from below when the stopper is in the slipping-off permitting position with the hook body fitted around the member, and with the elastic force acting on a lower end of the stopper return lever.

* * * * *